(12) United States Patent
Chen et al.

(10) Patent No.: US 10,297,907 B2
(45) Date of Patent: May 21, 2019

(54) MOBILE DEVICE

(71) Applicant: Wistron NeWeb Corp., Hsinchu (TW)

(72) Inventors: Ching-Wen Chen, Hsinchu (TW); Chia-Hao Chang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 15/935,347

(22) Filed: Mar. 26, 2018

(65) Prior Publication Data

US 2019/0027811 A1 Jan. 24, 2019

Related U.S. Application Data

(60) Provisional application No. 62/534,642, filed on Jul. 19, 2017.

(30) Foreign Application Priority Data

Feb. 26, 2018 (TW) .............................. 107106337 A (51) Int. Cl.
*H01Q 13/10* (2006.01)
*H01Q 1/24* (2006.01)
*H01Q 5/371* (2015.01)
*H04M 1/26* (2006.01)
*H04M 1/02* (2006.01)

(52) U.S. Cl.
CPC ............. *H01Q 1/243* (2013.01); *H01Q 5/371* (2015.01); *H01Q 13/10* (2013.01); *H04M 1/26* (2013.01); *H04M 1/0283* (2013.01)

(58) Field of Classification Search
None
See application file for complete search history.

(56) References Cited

U.S. PATENT DOCUMENTS

| 10,056,696 | B2* | 8/2018 | Tseng | ..................... H01Q 13/10 |
| 2013/0115884 | A1* | 5/2013 | Zhang | ..................... H01Q 1/243 |
| | | | | 455/41.2 |
| 2013/0207861 | A1* | 8/2013 | Huang | .................. H01Q 13/10 |
| | | | | 343/767 |

(Continued)

FOREIGN PATENT DOCUMENTS

| TW | 201703350 A | 1/2017 |
| TW | 201705610 A | 2/2017 |

*Primary Examiner* — Trinh V Dinh
(74) *Attorney, Agent, or Firm* — McClure, Qualey & Rodack, LLP (57) ABSTRACT

A mobile device includes a metal back cover, a ground metal element, a feeding radiation element, and a dielectric substrate. The metal back cover has a slot. The feeding radiation element has a feeding point, and includes a first feeding branch, a second feeding branch, and a third feeding branch. The second feeding branch and the first feeding branch extend in opposite directions. The third feeding branch and the first feeding branch extend in the same direction. The feeding radiation element has a vertical projection on the metal back cover, and the vertical projection at least partially overlaps the slot. The dielectric substrate is disposed adjacent to the metal back cover. The ground metal element and the feeding radiation element are disposed on the dielectric substrate. An antenna structure is formed by the feeding radiation element and the slot of the metal back cover.

17 Claims, 7 Drawing Sheets

(56) References Cited

U.S. PATENT DOCUMENTS

2017/0033467 A1* 2/2017 Huang ................ H01Q 13/106
2017/0207542 A1* 7/2017 Tseng .................... H01Q 13/10
2019/0027811 A1* 1/2019 Chen ..................... H01Q 1/243

* cited by examiner

MOBILE DEVICE

CROSS REFERENCE TO RELATED APPLICATIONS

This application claims the benefit of U.S. Provisional Application No. 62/534,642, filed on Jul. 19, 2017, the entirety of which is incorporated by reference herein. This application further claims priority of Taiwan Patent Application No. 107106337 filed on Feb. 26, 2018, the entirety of which is incorporated by reference herein.

BACKGROUND OF THE INVENTION

Field of the Invention

The disclosure generally relates to a mobile device, and more particularly, it relates to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, designers often incorporate metal elements into mobile devices. However, the newly added metal elements tend to negatively affect the antennas used for wireless communication in mobile devices, thereby degrading the overall communication quality of the mobile devices. As a result, there is a need to propose a mobile device with a novel antenna structure, so as to overcome the problems of the prior art.

BRIEF SUMMARY OF THE INVENTION

In an exemplary embodiment, the disclosure is directed to a mobile device including a metal back cover, a ground metal element, a feeding radiation element, and a dielectric substrate. The metal back cover has a slot. The ground metal element is coupled to the metal back cover. The feeding radiation element has a feeding point, and includes a first feeding branch, a second feeding branch, and a third feeding branch. An end of the first feeding branch is coupled to the feeding point. The first feeding branch has a first polygon. The first polygon has a long axis and a short axis. The long axis of the first polygon extends in a first direction. An end of the second feeding branch is coupled to the feeding point. The second feeding branch has a second polygon. The second polygon has a long axis and a short axis. The long axis of the second polygon extends in a second direction. The second direction is opposite to the first direction. An end of the third feeding branch is coupled to the feeding point. The third feeding branch has a third polygon. The third polygon has a long axis and a short axis. The long axis of the third polygon extends in the first direction. The dielectric substrate is disposed adjacent to the metal back cover. The ground metal element and the feeding radiation element are disposed on the dielectric substrate. The feeding radiation element has a vertical projection at least partially overlapping the slot. An antenna structure is formed by the feeding radiation element and the slot of the metal back cover.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
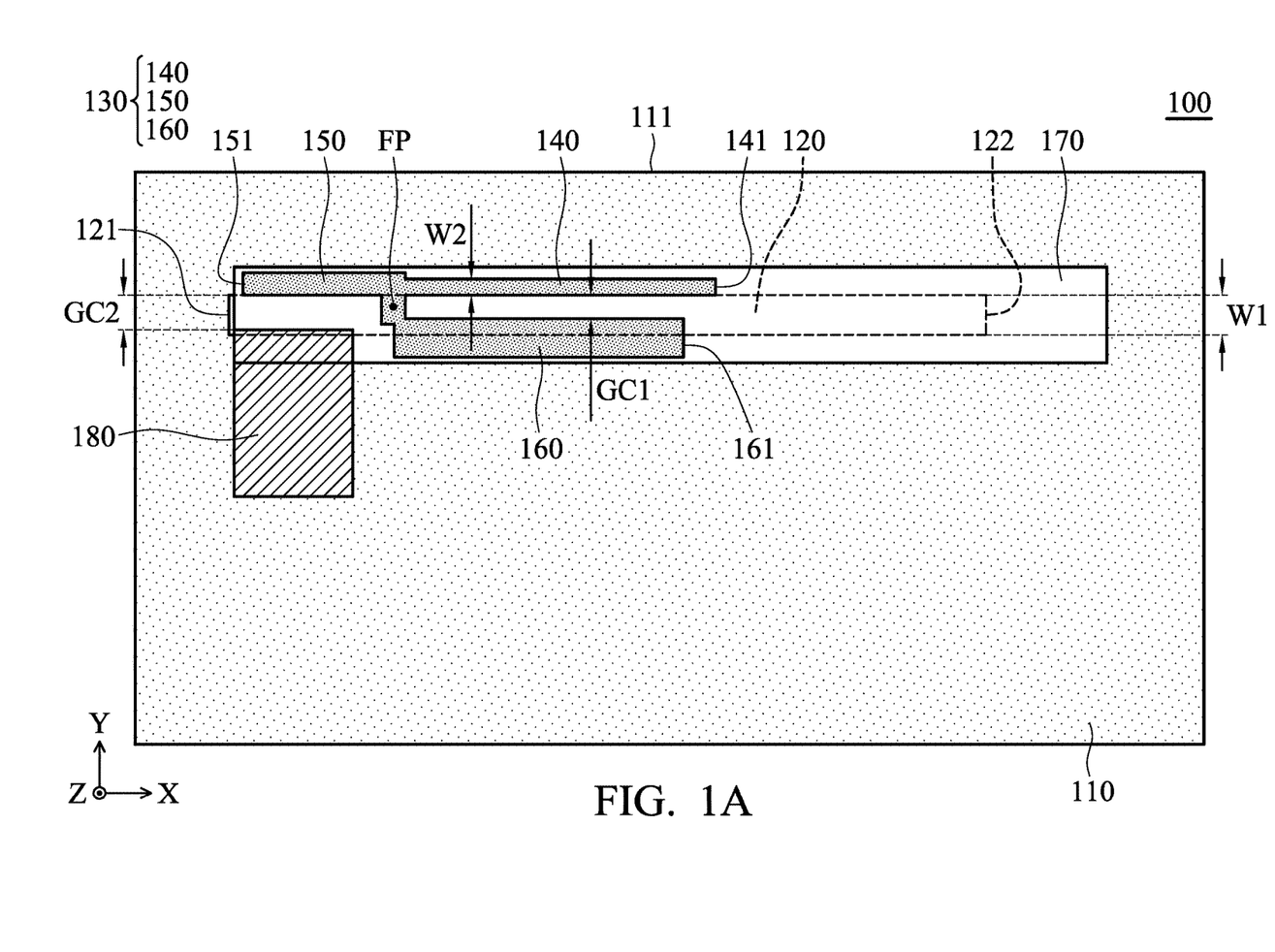
FIG. 1A is a top view of a mobile device according to an embodiment of the invention.
Figure 1B:
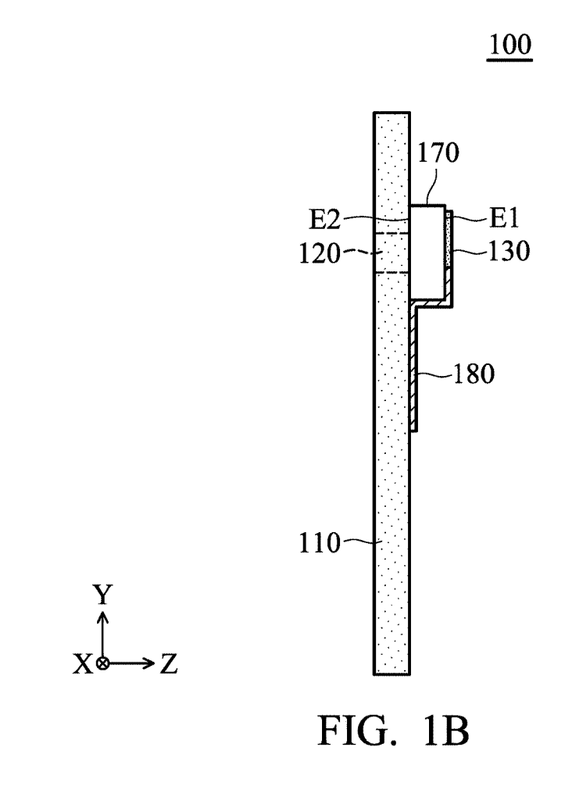
FIG. 1B is a side view of a mobile device according to an embodiment of the invention.

FIG. 1A is a top view of a mobile device 100 according to an embodiment of the invention. FIG. 1B is a side view of the mobile device 100 according to an embodiment of the invention. Please refer to FIG. 1A and FIG. 1B together. The mobile device 100 may be a smartphone, a tablet computer, or a notebook computer and includes a metal back cover 110, a feeding radiation element 130, a dielectric substrate 170, and a ground metal element 180. It should be understood that the mobile device 100 may further include other components, such as a processor, a touch control panel, a speaker, a battery module, and a housing, although they are not displayed in FIG. 1A and FIG. 1B. In alternative embodiments, the mobile device 100 is implemented with a deformable device which is capable of operating and switching between a tablet mode and a notebook mode.

The metal back cover 110 has a slot 120. The slot 120 may be substantially a straight-line-shaped opening or a rectangular opening. Specifically, the slot 120 is a closed slot having two closed ends 121 and 122 being away from each other. However, the invention is not limited to the above. In other embodiments, adjustments can be made such that the slot 120 can be a monopole slot having an open end the other end being closed. If the mobile device 100 is implemented with a notebook computer or a deformable device, an edge 111 of the metal back cover 110 can be adjacent to a hinge element (not shown) of the notebook computer or the deformable device. For example, the distance between the edge 111 of the metal back cover 110 and the hinge element may be shorter than 10 mm.

The feeding radiation element 130 may be made of a metal material, such as copper, silver, aluminum, iron, or their alloys. The dielectric substrate 170 may be an FR4 (Flame Retardant 4) substrate, a PCB (Printed Circuit Board), or an FCB (Flexible Circuit Board). The dielectric substrate 170 may have a first surface E1 and a second surface E2 opposite to the first surface E1. The feeding radiation element 130 and the ground metal element 180 are both disposed on the first surface E1 of the dielectric substrate 170. The second surface E2 of the dielectric substrate 170 may be close to or directly attached with the metal back cover 110 (adjacent to the slot 120), such that the dielectric substrate 170 can cover or nearly cover the entire slot 120 of the metal back cover 110. It should be noted that the term "adjacent" or "close" over the disclosure means that the distance (spacing) between two corresponding elements is smaller than a predetermined distance (e.g., 5 mm or shorter), or means that the two corresponding elements directly touch each other (i.e., the aforementioned distance/spacing therebetween is reduced to 0).

The ground metal element 180 is coupled to the metal back cover 110, and both of them can provide a ground voltage of the mobile device 100. For example, the ground metal element 180 may be a ground copper foil which extends from the dielectric substrate 170 onto the metal back cover 110. The feeding radiation element 130 has a feeding point FP, which may be coupled to a positive electrode of a signal source (not shown). A negative electrode of the signal source may be coupled to the ground metal element 180. For example, the signal source may be an RF (Radio Frequency) module for generating a transmission signal or processing a reception signal. In some embodiments, the positive electrode of the signal source is coupled through a central conductive line of a coaxial cable to the feeding point FP, and the negative electrode of the signal source is coupled through a conductive housing of the coaxial cable to the ground metal element 180. The feeding radiation element 130 extends across the slot 120 of the metal back cover 110. That is, the feeding radiation element 130 (including the first feeding branch 140, the second feeding branch 150, and the third feeding branch 160) has a vertical projection at least partially overlapping the slot 120.

Specifically, the feeding radiation element 130 includes a first feeding branch 140, a second feeding branch 150, and a third feeding branch 160. A combination of the first feeding branch 140, the second feeding branch 150, and the third feeding branch 160 may include a Y-shaped connection portion around the feeding point FP. The first feeding branch 140 has a first polygon, which may substantially have a rectangular shape or an L-shape. One end of the first feeding branch 140 is coupled to the feeding point FP, and another end of the first feeding branch 140 is an open end 141. The first polygon of the first feeding branch 140 at least has a long axis and a short axis. The long axis of the first polygon extends in a first direction, for instance, along the +X axis. For example, the long axis of the first polygon may be a first virtual straight-line parallel to the +X axis. The second feeding branch 150 has a second polygon, which may substantially have a rectangular shape or an L-shape. One end of the second feeding branch 150 is coupled to the feeding point FP, and another end of the second feeding branch 150 is an open end 151. The second polygon of the second feeding branch 150 at least has a long axis and a short axis. The long axis of the second polygon extends in a second direction, for instance, along the −X axis. For example, the long axis of the second polygon may be a second virtual straight-line parallel to the −X axis. In other words, the second direction may be opposite to the first direction, such that the first feeding branch 140 and the second feeding branch 150 may substantially extend in opposite directions. For example, the open end 141 of the first feeding branch 140 may extend in the direction of the +X axis, and the open end 151 of the second feeding branch 150 may extend in the direction of the −X axis. The third feeding branch 160 has a third polygon, which may substantially have a rectangular shape or an L-shape. One end of the third feeding branch 160 is coupled to the feeding point FP, and another end of the third feeding branch 160 is an open end 161. The third polygon of the third feeding branch 160 at least has a long axis and a short axis. The long axis of the third polygon also extends in the aforementioned first direction, such as the direction of the +X axis. For example, the long axis of the third polygon may be a third virtual straight-line parallel to the +X axis. In other words, the first feeding branch 140 and the third feeding branch 160 may substantially extend in the same direction. For example, the open end 141 of the first feeding branch 140 may extend in the direction of the +X axis, and the open end 161 of the third feeding branch 160 may also extend in the direction of the +X axis. Each of the first feeding branch 140, the second feeding branch 150, and the third feeding branch 160 is at least partially parallel to the slot 120 of the metal back cover 110. In some embodiments, a long axis (passing through the two closed ends 121 and 122) of the slot 120 is substantially parallel to the long axis of the first feeding branch 140, the long axis of the second feeding branch 150, and the long axis of the third feeding branch 160. In addition, a first coupling gap GC1 may be formed between the first feeding branch 140 and the third feeding branch 160, and a second coupling gap GC2 may be formed between the second feeding branch 150 and the ground metal element 180. In a preferred embodiment, an antenna structure is formed by the metal back cover 110, the slot 120, and the feeding radiation element 130.

Figure 2:
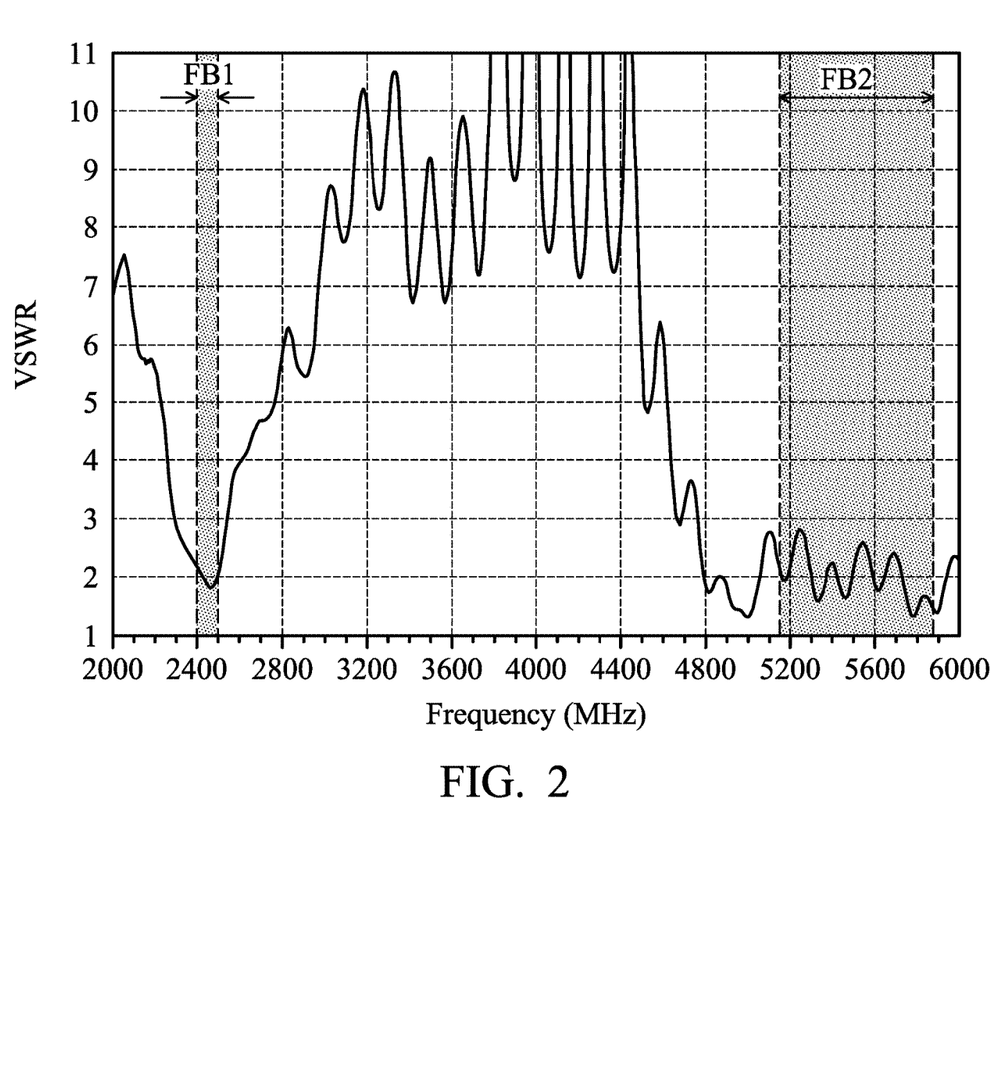
FIG. 2 is a diagram of VSWR (Voltage Standing Wave Ratio) of an antenna structure of a mobile device according to an embodiment of the invention.

FIG. 2 is a diagram of VSWR (Voltage Standing Wave Ratio) of the antenna structure of the mobile device 100 according to an embodiment of the invention. The horizontal axis represents the operation frequency (MHz), and the vertical axis represents the VSWR. According to the measurement of FIG. 2, when transmitting or receiving wireless signals, the antenna structure of the mobile device 100 can cover a first frequency band FB1 and a second frequency band FB2. The first frequency band FB1 may be from about 2400 MHz to about 2500 MHz. The second frequency band FB2 may be from about 5150 MHz to about 5875 MHz. Therefore, the antenna structure of the mobile device 100 can support at least the wideband operations of Bluetooth and WLAN (Wireless Local Area Network) 2.4 GHz/5 GHz. According to practical measurement, the antenna efficiency of the antenna structure of the mobile device 100 operating in the first frequency band FB1 is about −3.78 dB, and the antenna efficiency of the antenna structure of the mobile device 100 operating in the second frequency band FB2 is about −3.95 dB (improved by about 2 dB to 4 dB in comparison to the antenna efficiency of a conventional slot antenna). The proposed design can meet the requirements of practical applications of general mobile communication devices.

In some embodiments, the operation principle of the antenna structure of the mobile device 100 is as follows. The first feeding branch 140 and the slot 120 of the metal back cover 110 are excited to generate the first frequency band FB1. The second feeding branch 150 is excited to generate the second frequency band FB2. The third feeding branch 160 is further excited by the first feeding branch 140 using a coupling mechanism, so as to increase both the radiation efficiency and the operation bandwidth of the first frequency band FB1 and the second frequency band FB2. Since the feeding radiation element 130 has a meandering shape (e.g., the three different feeding branches), it can significantly reduce the total area of the antenna structure of the mobile device 100.

In some embodiments, the element sizes of the mobile device 100 are as follows. The length of the slot 120 (i.e., the length from the closed end 121 to the other closed end 122) may be substantially equal to 0.5 wavelength ($\lambda/2$) of the central frequency of the first frequency band FB1. The length of the first feeding branch 140 (i.e., the length from the feeding point FP to the open end 141) may be substantially equal to 0.25 wavelength ($\lambda/4$) of the central frequency of the first frequency band FB1. The length of the second feeding branch 150 (i.e., the length from the feeding point FP to the open end 151) may be substantially equal to 0.25 wavelength ($\lambda/4$) of the central frequency of the second frequency band FB2. The length of the third feeding branch 160 (i.e., the length from the feeding point FP to the open end 161) may be from 0.125 to 0.25 wavelength ($\lambda/8 \sim \lambda/4$) of the central frequency of the first frequency band FB1. In order to enhance the coupling effect between elements, the width of the first coupling gap GC1 may be shorter than or equal to the width W1 of the slot 120, and the width of the second coupling gap GC2 may be shorter than or equal to the width W1 of the slot 120. The above element sizes are calculated and obtained according to many experiment results, and they can help to optimize the operation bandwidth and the impedance matching of the antenna structure of the mobile device 100.

It should be understood that the shape of the feeding radiation element 130 can be fine-tuned according to different requirements. For example, the Y-shaped connection portion between the first feeding branch 140, the second feeding branch 150, and the third feeding branch 160 (i.e., the portion around the feeding point FP) may be modified to have a smooth shape for removing discontinuous serrate edges, without affecting the performance of the invention. The following embodiments will introduce different configurations of the proposed antenna structure. However, these figures and descriptions are merely exemplary, rather than limitations of the invention.

Figure 3:
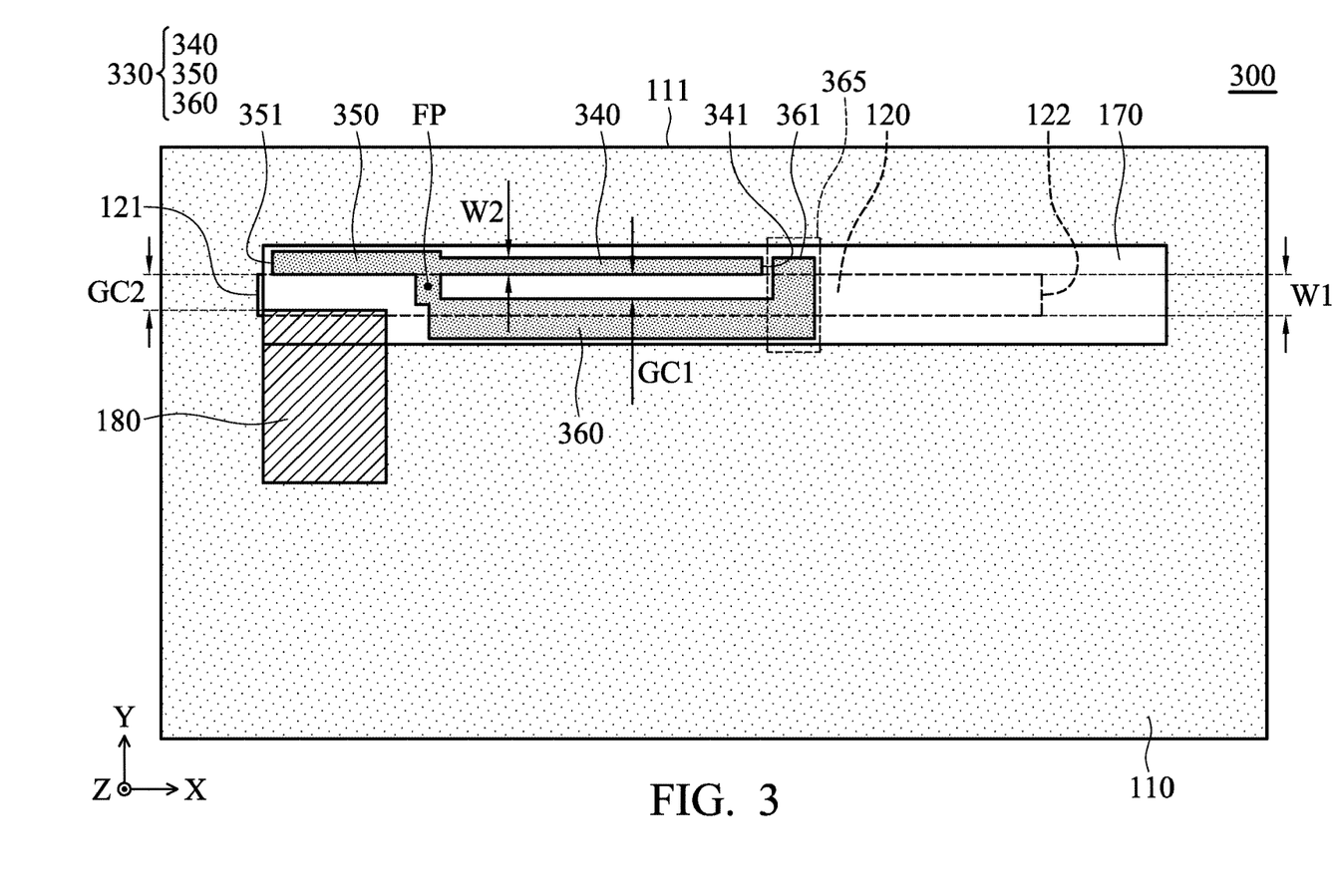
FIG. 3 is a top view of a mobile device according to an embodiment of the invention.

FIG. 3 is a top view of a mobile device 300 according to an embodiment of the invention. FIG. 3 is similar to FIG. 1A. In the embodiment of FIG. 3, a feeding radiation element 330 of the mobile device 300 includes a first feeding branch 340, a second feeding branch 350, and a third feeding branch 360. The third feeding branch 360 further includes a terminal bending portion 365, such that an open end 361 of the third feeding branch 360 is closer to an open end 341 of the first feeding branch 340. The terminal bending portion 365 may be substantially perpendicular to the other portions of the third feeding branch 360. The third feeding branch 360 (i.e., the third polygon) with the terminal bending portion 365 may substantially have a U-shape. The incorporation of the terminal bending portion 365 can reduce the effective width of the first coupling gap GC1 between the first feeding branch 340 and the third feeding branch 360, so as to enhance the coupling effect between the first feeding branch 340 and the third feeding branch 360. With such a design, the radiation efficiency of the antenna structure of the mobile device 300 is significantly increased within the first frequency band FB1. Other features of the mobile device 300 of FIG. 3 are similar to those of the mobile device 100 of FIG. 1A and FIG. 1B. Accordingly, the two embodiments can achieve similar level of performance.

Figure 4:
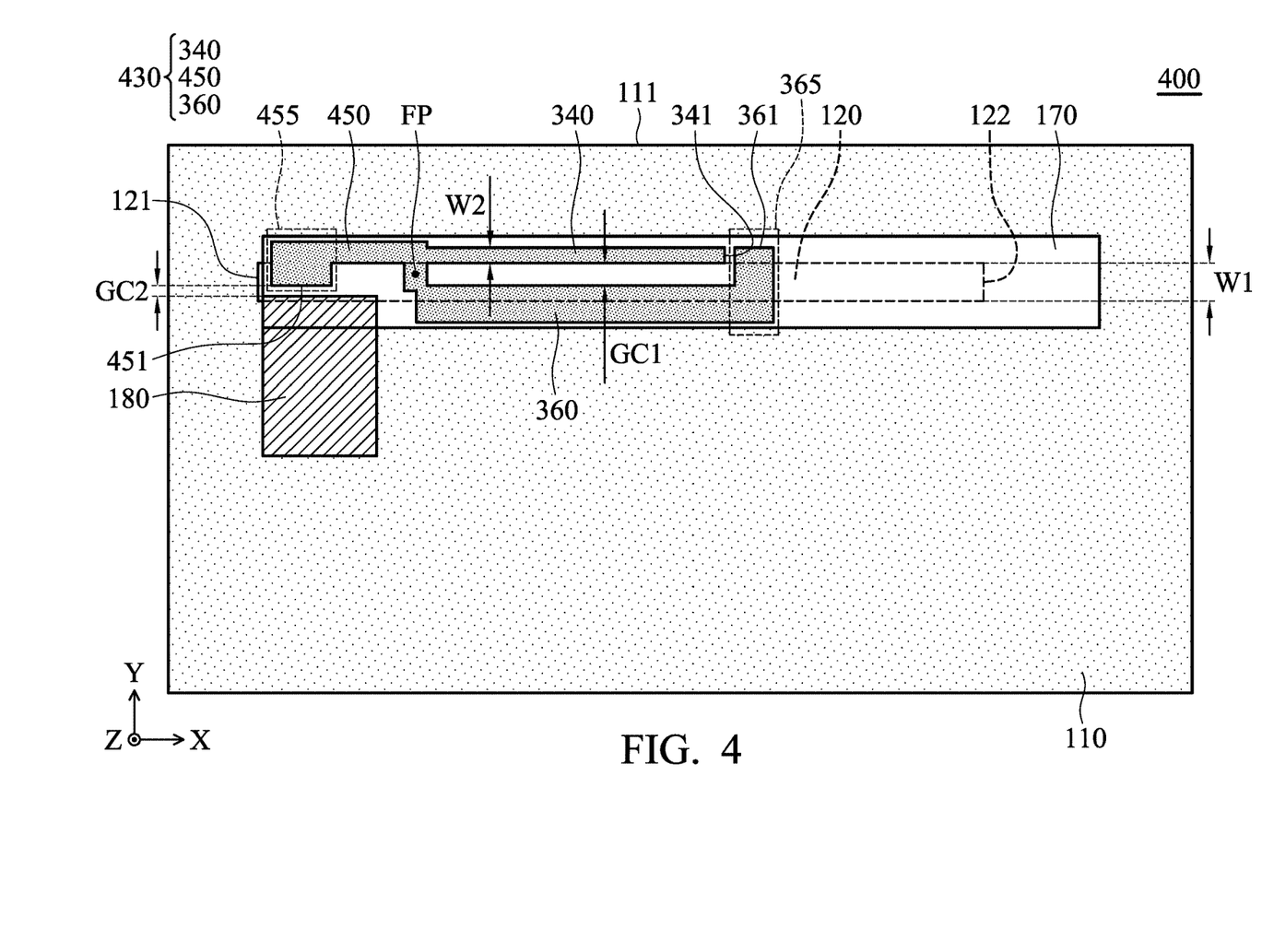
FIG. 4 is a top view of a mobile device according to an embodiment of the invention.

FIG. 4 is a top view of a mobile device 400 according to an embodiment of the invention. FIG. 4 is similar to FIG. 3. In the embodiment of FIG. 4, a second feeding branch 450 of a feeding radiation element 430 of the mobile device 400 further includes a terminal bending portion 455, such that an open end 451 of the second feeding branch 450 is closer to the ground metal element 180. The terminal bending portion 455 may be substantially perpendicular to the other portions of the second feeding branch 450. The second feeding branch 450 (i.e., the second polygon) with the terminal bending portion 455 may substantially have an L-shape. The incorporation of the terminal bending portion 455 can reduce the effective width of the second coupling gap GC2 between the second feeding branch 450 and the ground metal element 180, so as to fine-tune the impedance matching of the second feeding branch 450 and the ground metal element 180. With such a design, the radiation efficiency of the antenna structure of the mobile device 400 is significantly increased within the second frequency band FB2. Other features of the mobile device 400 of FIG. 4 are similar to those of the mobile device 300 of FIG. 3. Accordingly, the two embodiments can achieve similar level of performance.

Figure 5:
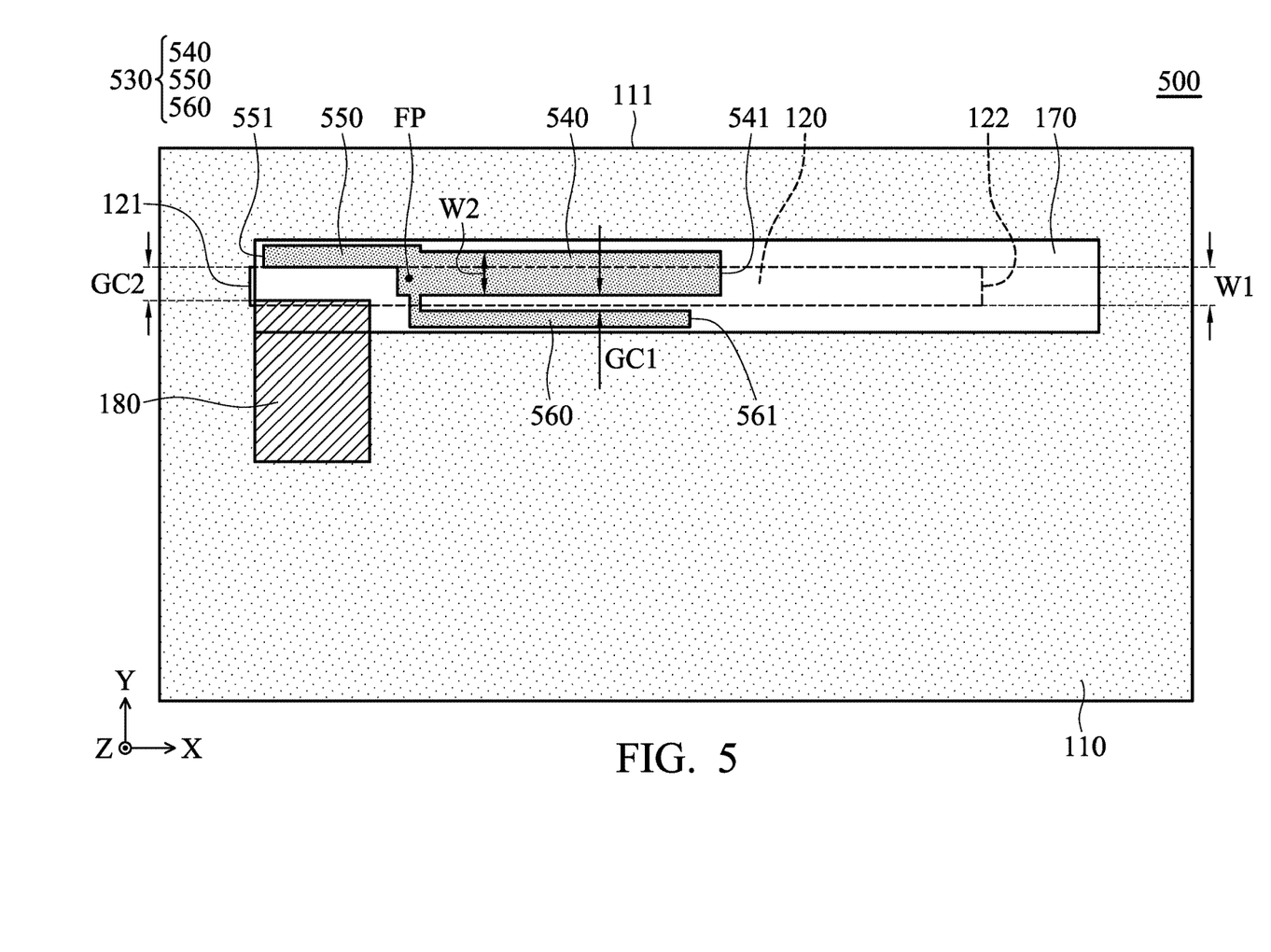
FIG. 5 is a top view of a mobile device according to an embodiment of the invention.

FIG. 5 is a top view of a mobile device 500 according to an embodiment of the invention. FIG. 5 is similar to FIG. 1A. In the embodiment of FIG. 5, a feeding radiation element 530 of the mobile device 500 includes a first feeding branch 540, a second feeding branch 550, and a third feeding branch 560. The width W2 of the first feeding branch 540 is apparently increased (e.g., the width W2 of FIG. 5 may be about two or more times the width W2 of FIG. 1A). Thus, the first feeding branch 540 has a vertical projection at least partially overlapping the slot 120. For example, the width W2 of the first feeding branch 540 may be longer than or equal to the width W1 of the slot 120, but it is not limited thereto. The first feeding branch 540 is widened to reduce the effective width of the first coupling gap GC1 between the first feeding branch 540 and the third feeding branch 560, thereby enhancing the coupling effect between the first feeding branch 540 and the third feeding branch 560. With such a design, the radiation efficiency of the antenna structure of the mobile device 500 is significantly increased within the first frequency band FB1. Other features of the mobile device 500 of FIG. 5 are similar to those of the mobile device 100 of FIG. 1A and FIG. 1B. Accordingly, the two embodiments can achieve similar level of performance.

Figure 6:
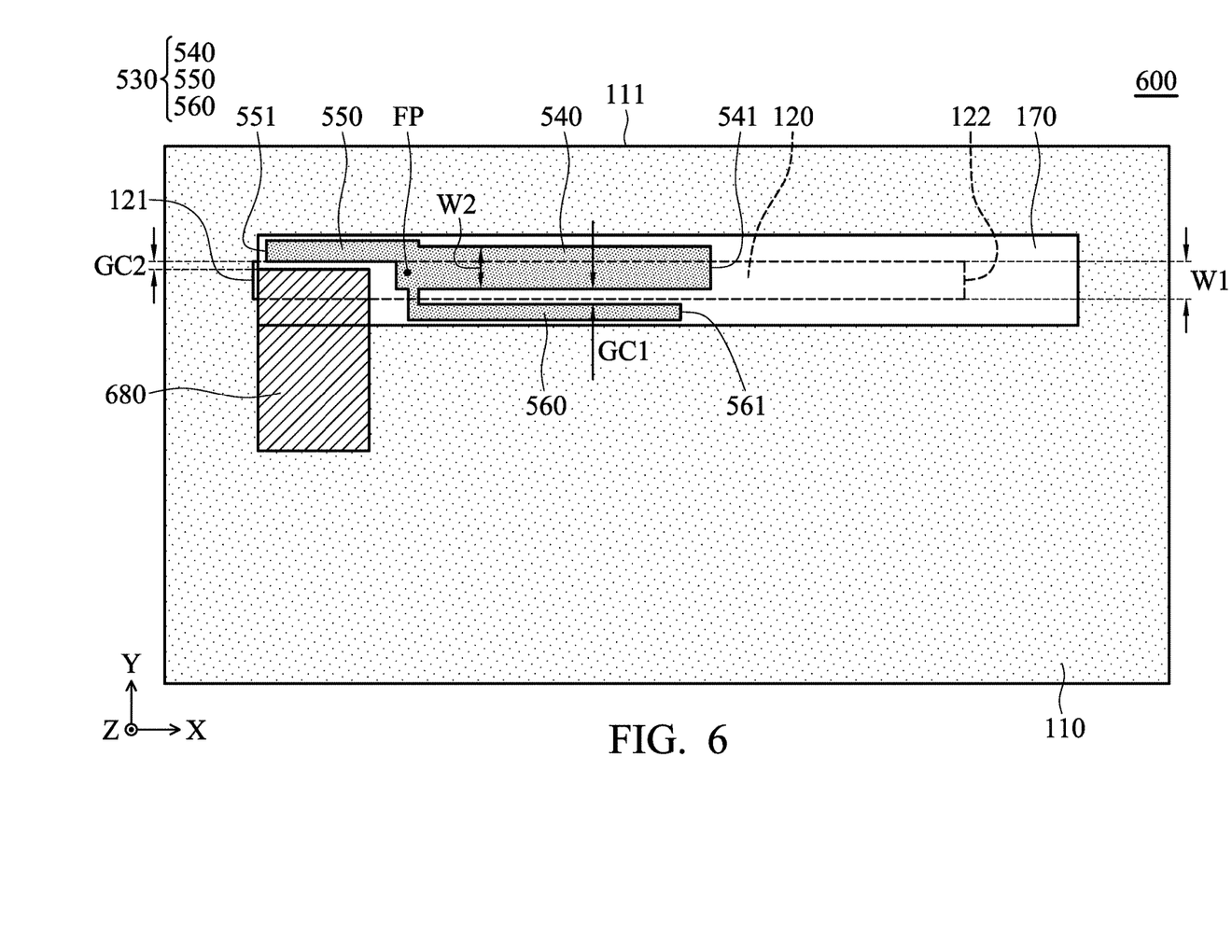
FIG. 6 is a top view of a mobile device according to an embodiment of the invention.

FIG. 6 is a top view of a mobile device 600 according to an embodiment of the invention. FIG. 6 is similar to FIG. 5. In the embodiment of FIG. 6, a ground metal element 680 of the mobile device 600 is moved in the direction toward the second feeding branch 550. Thus, the ground metal element 680 has a vertical projection at least partially overlapping the slot 120. The effective width of the second coupling gap GC2 between the second feeding branch 550 and the ground metal element 680 can be reduced by adjusting the location of the ground metal element 680, so as to fine-tune the impedance matching of the second feeding branch 550 and the ground metal element 680. With such a design, the radiation efficiency of the antenna structure of the mobile device 600 is significantly increased within the second frequency band FB2. Other features of the mobile device 600 of FIG. 6 are similar to those of the mobile device 500 of FIG. 5. Accordingly, the two embodiments can achieve similar level of performance.

The invention proposes a novel antenna structure with a slot. When the antenna structure is applied to a mobile device including a metal back cover, it effectively prevents the metal back cover from negatively affecting the communication quality of the mobile device because the metal back cover is considered as an extension portion of the antenna structure. It should be also noted that the invention can improve the appearance and design of the mobile device, without opening any antenna windows on the metal back cover. In comparison to the conventional design, the invention has at least the advantages of small size, wide bandwidth, high antenna efficiency in the high and low frequency bands, strong device stability, and beautiful device appearance, and therefore it is suitable for application in a variety of mobile communication devices.

Note that the above element sizes, element shapes, and frequency ranges are not limitations of the invention. An antenna designer can fine-tune these settings or values according to different requirements. It should be understood that the mobile device and antenna structure of the invention are not limited to the configurations of FIGS. 1-6. The invention may merely include any one or more features of any one or more embodiments of FIGS. 1-6. In other words, not all of the features displayed in the figures should be implemented in the mobile device and antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device, comprising:
a metal back cover, having a slot;
a ground metal element, coupled to the metal back cover;
a feeding radiation element, having a feeding point, wherein the feeding radiation element comprises:
a first feeding branch, wherein an end of the first feeding branch is coupled to the feeding point, the first feeding branch has a first polygon, the first polygon has a long axis and a short axis, and the long axis of the first polygon extends in a first direction;
a second feeding branch, wherein an end of the second feeding branch is coupled to the feeding point, the second feeding branch has a second polygon, the second polygon has a long axis and a short axis, the long axis of the second polygon extends in a second direction, and the second direction is opposite to the first direction; and
a third feeding branch, wherein an end of the third feeding branch is coupled to the feeding point, the third feeding branch has a third polygon, the third polygon has a long axis and a short axis, and the long axis of the third polygon extends in the first direction; and
a dielectric substrate, disposed adjacent to the metal back cover, wherein the ground metal element and the feeding radiation element are disposed on the dielectric substrate;
wherein the feeding radiation element has a vertical projection at least partially overlapping the slot;
wherein an antenna structure is formed by the feeding radiation element and the slot of the metal back cover.

2. The mobile device as claimed in claim 1, wherein the slot is a closed slot and substantially has a rectangular shape, and wherein a long axis of the slot is parallel to the long axis of the first feeding branch, the long axis of the second feeding branch, and the long axis of the third feeding branch.

3. The mobile device as claimed in claim 1, wherein the other end of each of the first feeding branch, the second feeding branch, and the third feeding branch is an open end.

4. The mobile device as claimed in claim 1, wherein the first polygon substantially has a rectangular shape.

5. The mobile device as claimed in claim 1, wherein the second polygon substantially has a rectangular shape or an L-shape.

6. The mobile device as claimed in claim 1, wherein the third polygon substantially has a rectangular shape, an L-shape, or a U-shape.

7. The mobile device as claimed in claim 1, wherein the ground metal element is a ground copper foil extending from the dielectric substrate onto the metal back cover.

8. The mobile device as claimed in claim 1, wherein a first coupling gap is formed between the first feeding branch and the third feeding branch, and wherein a width of the first coupling gap is shorter than or equal to a width of the slot.

9. The mobile device as claimed in claim 1, wherein a second coupling gap is formed between the second feeding branch and the ground metal element, and wherein a width of the second coupling gap is shorter than or equal to a width of the slot.

10. The mobile device as claimed in claim 1, wherein the antenna structure covers a first frequency band from 2400 MHz to 2500 MHz, and a second frequency band from 5150 MHz to 5875 MHz.

11. The mobile device as claimed in claim 1, wherein a length of the slot is substantially equal to 0.5 wavelength of a central frequency of the first frequency band.

12. The mobile device as claimed in claim 1, wherein a length of the first feeding branch is substantially equal to 0.25 wavelength of a central frequency of the first frequency band.

13. The mobile device as claimed in claim 1, wherein the first feeding branch and the slot of the metal back cover are excited to generate the first frequency band.

14. The mobile device as claimed in claim 1, wherein a length of the second feeding branch is substantially equal to 0.25 wavelength of a central frequency of the second frequency band.

15. The mobile device as claimed in claim 1, wherein the second feeding branch is excited to generate the second frequency band.

16. The mobile device as claimed in claim 1, wherein a length of the third feeding branch is from 0.125 to 0.25 wavelength of a central frequency of the first frequency band.

17. The mobile device as claimed in claim 1, wherein the third feeding branch is configured to increase radiation efficiency and operation bandwidth of the first frequency band and the second frequency band.

* * * * *